Patented Dec. 30, 1952

2,623,915

UNITED STATES PATENT OFFICE 2,623,915

NEGATIVE ELECTRODE FOR BATTERY CELLS

Joseph Donald Moulton, West Orange, N. J., assignor to Thomas A. Edison, Incorporated, West Orange, N. J., a corporation of New Jersey No Drawing. Original application December 13, 1945, Serial No. 634,822, now Patent No. 2,561,943, dated July 25, 1951. Divided and this application February 8, 1951, Serial No. 210,093

3 Claims. (Cl. 136—106)

This application is a division of the pending application Serial No. 634,822, entitled "Electric Batteries" and filed December 13, 1945, now U. S. Patent 2,561,943, granted July 24, 1951.

This invention relates particularly to negative electrodes for primary cells having an alkaline electrolyte.

Objects of the invention are to provide an improved negative electrode which has high current efficiency per units of weight and volume thereof, which can be discharged at extremely high rates and which will reach its full discharge rate almost instantly.

The foregoing objects are obtained by a novel construction of a negative electrode which permits the electrolyte of the cell to come almost instantly into intimate and effective contact with substantially all of the active material of the electrode.

As will appear, the invention is carried out by bonding zinc dust, with the use of a vegetable gum, to a metal-gauze framework.

The negative electrode of the present invention is hereinafter referred to as a negative plate because of its plate-like form. This negative plate comprises a framework of copper wire gauze which supports the active material and conducts the current thereto. The gauze is preferably a 45 x 45 mesh screen woven of 0.0065" copper wire and pressed between platens to a thickness of from 0.007" to 0.009". This compression affects mainly the points where the wires are crossed in the gauze. Onto this pressed gauze framework there is applied and bonded an active material preferably consisting of finely-divided zinc dust or powder.

The zinc dust is prepared for application to the gauze framework by mixing it with a sufficient quantity of water and a binder to produce a paste, the binder being added to hold the zinc in place on the framework after the paste is dried. The binder is one which is soluble in contact with water. Water-soluble vegetable gums are best suited for this purpose. One such particularly-effective binder is an alkaline-treated vegetable gum known on the market as "Ondulum." This product is manufactured by the Glyco Products Company, New York city, and is marketed as a dry powder.

The binder solution used in preparing the paste is made by adding about 450 ml. of boiling distilled water to 21.5 grams of the vegetable gum powder and, after mixing for twenty minutes in a mechanical stirrer, making the cooled solution up to 500 ml. with distilled water. A binder equivalent to about 1% by weight of the zinc is added to this solution to form a paste.

After the paste has been mixed it is applied to the pressed gauze with a spatula or a brush so as to cover the gauze to the desired thickness. The plate is then oven-dried at 85° C. for an hour and stored for future use. A plate properly coated for use may have a substantially uniform thickness of typically 0.013". Such plates which have a surface area of approximately 38.3 sq. in. will, when completed, contain from 14 to 16 grams of active material.

By way of example, a cell may contain 29 such negative plates grouped with 28 alternating positive plates and with intervening spacers, the positive plates being for example nickel-plated copper wire gauze coated with silver oxide ($Ag_2O_2$) as described in the parent application above mentioned. Each such electrode assembly may be typically 1½" thick, 6⅛" wide and 6⅜" high. When 110 of such cells are series-connected and activated with a 25% solution of potassium hydroxide (KOH), it will deliver approximately 2000 amperes at 140 volts for a period of at least three minutes. Moreover, the discharge will start substantially instantaneously since it will reach 75% of the desired rate in about one and one-half seconds and the full discharge rate of 2000 amperes within three seconds. The ability of this battery to discharge such high currents almost instantly is due in great measure to the novel construction of the negative plates above described.

The embodiment of my invention herein described is intended to be illustrative and not limitative of my invention since the same is subject to modifications within the scope of my invention, which I endeavor to express according to the following claims.

I claim:

1. A negative plate for a primary cell adapted for discharge in one operation at high current, comprising a metallic wire gauze, and an adherent coating on said gauze comprising an oven-dried mixture of zinc powder and water-soluble vegetable gum.

2. A negative plate for an alkaline-electrolyte primary cell adapted for discharge in one operation at high current, comprising a metallic wire gauze compressed to effect a substantial reduction in the thickness thereof, and an adherent coating on said gauze comprising a dried paste of zinc powder and alkaline-treated water-soluble vegetable gum.

3. A negative plate for a deferred-action alkaline-electrolyte primary cell adapted for discharge in one operation at high current, comprising a metallic wire gauze and an adherent coating on said gauze composed of an oven-dried paste of zinc powder and an aqueous solution of a powdered alkali-treated vegetable gum, said solution being composed of approximately 21 grams of said vegetable gum dissolved in 500 ml. of water, and said paste being a mixture of said zinc powder and an amount of said solution containing approximately 1% of said gum by weight of the zinc.

JOSEPH DONALD MOULTON.

REFERENCES CITED

The following references are of record in the file of this patent:

UNITED STATES PATENTS

| Number | Name | Date |
| --- | --- | --- |
| 2,050,172 | Gordon | Aug. 4, 1936 |
| 2,501,673 | Glassner | Mar. 28, 1950 |
| 2,526,692 | Ruben | Oct. 24, 1950 |